Dec. 10, 1929.  T. F. BAILY  1,739,343
MELTING AND REFINING FURNACE
Filed Jan. 28, 1928
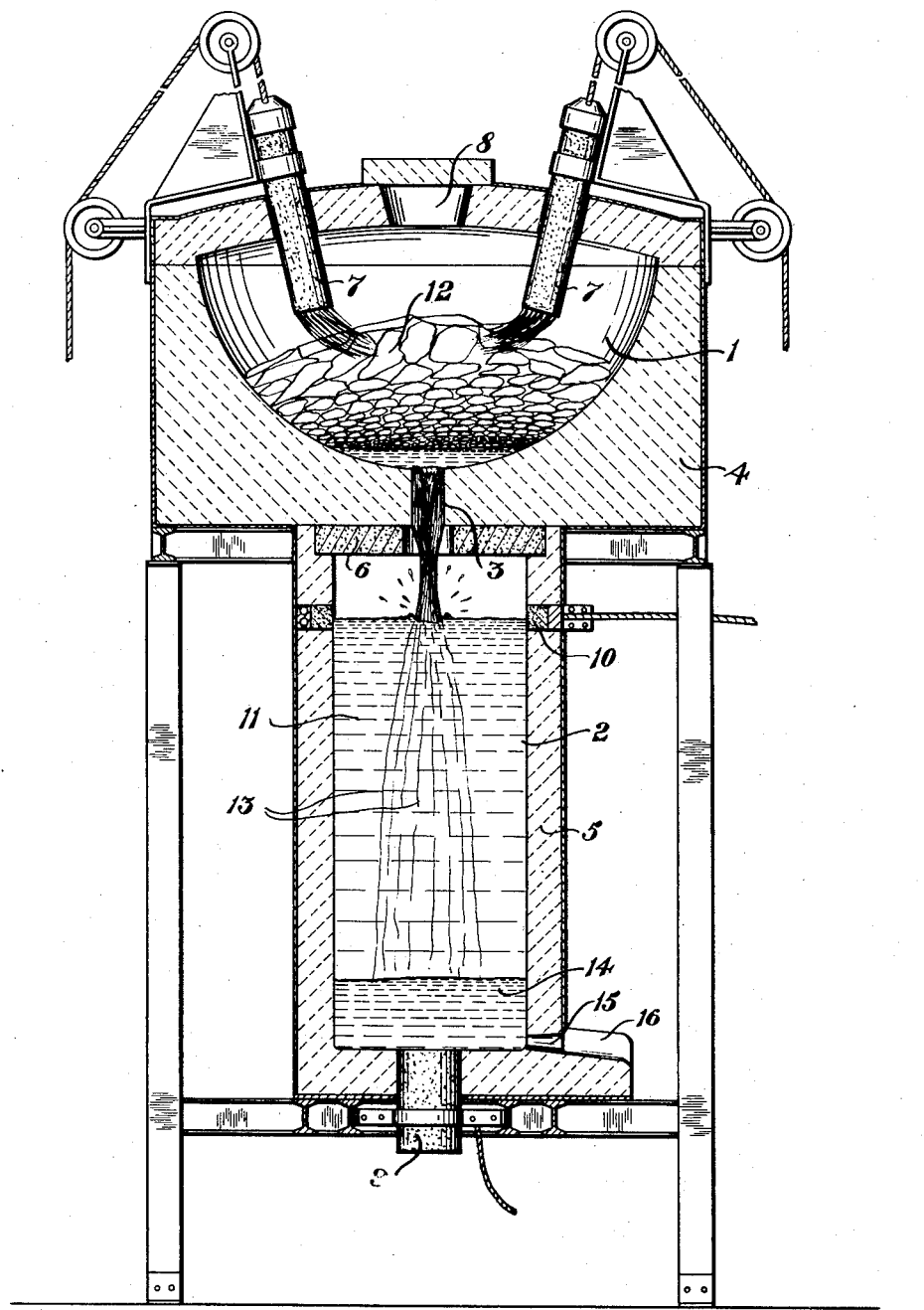
Inventor
T. F. Baily Patented Dec. 10, 1929

1,739,343

UNITED STATES PATENT OFFICE

THADDEUS F. BAILY, OF ALLIANCE, OHIO

MELTING AND REFINING FURNACE

Application filed January 28, 1928. Serial No. 250,219.

This invention relates to an electric furnace for melting and refining metals and more particularly to a furnace having an upper portion operated as an arc furnace and an opening in the bottom of the arc furnace of sufficient size to allow the melted metal to flow out of the bottom, but small enough to prevent the unmelted metal from passing through the opening, and the bottom part of the furnace adapted to be operated as a resistance furnace for refining the material melted in the upper or arc portion of the furnace.

In the past it has been common practice to melt material on the hearth of an electric furnace, such as the Heroult type, and after the charge was completely melted it was refined by means of a slag floating on the top of the molten metal; and since only a small portion of the total bath of molten metal was in contact with the slag at any time, the refining action is relatively slow in this process.

Further, the intense heat of the articles during the refining time readily melts the brickwork, particularly the side walls and roofs, as well as making a greater heat loss from the furnace during this refining time, while in the melting down time, due to the furnace being at a lower temperature owing to the unmelted material in the furnace, the heat loss is relatively low and there is little punishment to the roof or walls.

The object of the improvement is to provide a furnace in which the upper or melting portion of the furnace is always operating in the condition of a melting down period in the older type of furnace referred to, and hence there is never any considerable punishment of the refractories mentioned.

The refining operation in this new furnace being carried on by resistance rather than an arc, at no time is there any punishment of the refractories such as is common with the older type of arc furnace, as in this new furnace the refining period is obviously carried on without localized high temperature such as is produced in the arc furnace during the refining period mentioned.

Another advantage of this new type of furnace in refining is that there is only a small portion of the metal at any one time in the refining process and it is so thoroughly subdivided and the stream or streams being relatively small, there is a large volume of slag in contact with the metal at any time as compared with the condition in the ordinary arc melting furnace referred to wherein, in order to refine, the furnace must be operated as a batch process.

An embodiment of the invention is illustrated in the accompanying drawing, in which The figure is a vertical, sectional view of the improved furnace.

Similar numerals refer to similar parts throughout the drawing.

The improved furnace may comprise the melting chamber 1 and refining chamber 2, communicating at its upper end with the melting chamber, as by the opening 3 in the bottom thereof.

Both the melting and refining chambers may be lined with suitable refractories, as shown at 4 and 5 respectively, and a carbon block 6 may be located between the upper end of the refining chamber and the bottom of the melting chamber for supporting the melting chamber and preventing excessive punishment of the same by the heat from the refining chamber.

Movable electrodes 7 may be located in the melting chamber, and a central charging opening 8 may be provided therein, whereby material may be charged into the chamber, between said electrodes.

The refining chamber may be provided with the lower electrode 9, in its bottom portion, and the upper electrode 10, preferably of ring form, in its upper portion, both of said electrodes being located in the same circuit.

In operating the furnace for the purpose of the invention, slag may be charged into the melting chamber, where it is melted down, the molten slag pouring down through the opening 3, into the refining chamber.

When the molten slag, as indicated at 11, reaches the upper, or ring electrode 10, of the refining chamber, current will be carried through the slag between the electrodes 9 and 10, the molten slag becoming an electric resistor, and thus being kept in molten condition.

The scrap steel, or other material, to be refined, is then charged into the melting chamber, as indicated at 12, where it is melted down, the molten metal pouring from the opening 3 into the refining chamber.

This molten metal will pass down through the molten slag resistor, in fine streams, as shown at 13, where the refining takes place, the metal collecting in the bottom of the refining chamber, beneath the slag, as shown at 14.

From time to time, the purified, molten metal may be withdrawn from the refining chamber by removing the plug 15 from the pouring spout 16.

From the above it will be seen that the refining operation is carried on by electric resistance, through the molten slag, thus obviating localized high temperatures such as produced in the arc furnaces commonly used for refining, and thus preventing the punishment of the refractories common in furnaces of that type.

It will also be seen that only a small portion of the metal is in the slag at any one time, the metal being so divided into small streams that a relatively large volume of slag contacts with the metal as compared with common practice in arc furnace refining of steels and the like.

I claim:

1. Apparatus for melting and refining metals including walls forming a melting chamber, there being an opening in one of the walls for charging solid material to be melted into the melting chamber, electrodes movably mounted in the melting chamber walls extending into the melting chamber, walls forming a refining chamber located below the melting chamber, an electrode in the upper portion of the refining chamber, an electrode in the lower portion of the refining chamber, molten slag in the refining chamber extending between the upper and lower refining chamber electrodes, means for passing an electric current between the refining chamber electrodes through the slag for maintaining the slag in molten condition, means for producing an arc between the melting electrodes and the solid material for melting the material, means communicating between the melting chamber and refining chamber whereby material melted in the melting chamber will pass by gravity through the communicating means into the refining chamber and through the molten slag to the lower portion of the refining chamber, and means for withdrawing refined metal from the lower portion of the refining chamber.

2. Apparatus for melting and refining metals including walls forming a melting chamber having a hearth composed of material inert to the action of materials being melted, there being an opening in one of the walls for charging solid material to be melted into the melting chamber, electrodes movably mounted in the melting chamber walls extending into the melting chamber, walls forming a refining chamber located below the melting chamber, an electrode in the upper portion of the refining chamber, an electrode in the lower portion of the refining chamber, molten slag in the refining chamber extending between the upper and lower refining chamber electrodes, means for passing an electric current between the refining chamber electrodes through the slag for maintaining the slag in molten condition, means for producing an arc between the melting electrodes and the solid material for melting the material, means communicating between the melting chamber and refining chamber whereby material melted in the melting chamber will pass by gravity through the communicating means into the refining chamber and through the molten slag to the lower portion of the refining chamber, and means for withdrawing refined metal from the lower portion of the refining chamber.

3. Apparatus for melting and refining metals including walls forming a melting chamber, there being an opening in one of the walls for charging solid material to be melted into the melting chamber, electrodes movably mounted in the melting chamber walls extending into the melting chamber, walls forming a refining chamber located below the melting chamber, a ring electrode in the upper portion of the refining chamber, an electrode in the lower portion of the refining chamber, molten slag in the refining chamber extending between the upper and lower refining chamber electrodes, means for passing an electric current between the refining chamber electrodes through the slag for maintaining the slag in molten condition, means for producing an arc between the melting electrodes and the solid material for melting the material, means communicating between the melting chamber and refining chamber whereby material melted in the melting chamber will pass by gravity through the communicating means into the refining chamber and through the molten slag to the lower portion of the refining chamber, and means for withdrawing refined metal from the lower portion of the refining chamber.

4. Apparatus for melting and refining metals including walls forming a melting chamber, there being an opening in one of the walls for charging solid material to be melted into the melting chamber, electrodes movably mounted in the melting chamber walls extending into the melting chamber, walls forming a refining chamber located below the melting chamber, an electrode in the upper portion of the refining chamber, an electrode in the lower portion of the refining chamber, molten slag in the refining chamber extending between the upper and lower refining chamber electrodes, means for passing an electric current between the refining chamber electrodes through the slag for maintaining the slag in molten condition, means for producing an arc between the melting electrodes and the solid material for melting the material, means communicating between the melting chamber and refining chamber whereby material melted in the melting chamber will pass by gravity through the communicating means into the refining chamber and through the molten slag to the lower portion of the refining chamber, a carbon block located between the upper end of the refining chamber and the bottom of the melting chamber for supporting the melting chamber and preventing the excessive heat from the refining chamber from damaging the walls of the melting chamber, and means for withdrawing refined metal from the lower portion of the refining chamber.

In testimony that I claim the above, I have hereunto subscribed my name.

THADDEUS F. BAILY.